United States Patent [19]

Ito et al.

[11] Patent Number: 5,781,269
[45] Date of Patent: Jul. 14, 1998

[54] DISTANCE MEASURING METHOD AND DISTANCE SENSOR

[75] Inventors: Masami Ito; Kanji Nishii, both of Osaka; Tsuyoshi Nomura, Kyoto; Seiji Hamano, Osaka, all of Japan

[73] Assignee: Matsushita Electric Industrial Co., Ltd., Osaka, Japan

[21] Appl. No.: 847,991

[22] Filed: Apr. 22, 1997

[30] Foreign Application Priority Data

Apr. 23, 1996 [JP] Japan ................................. 8-101347

[51] Int. Cl.$^6$ .................................................. G01B 11/00
[52] U.S. Cl. ...................... 356/375; 356/3.01; 356/3.09; 250/559.38
[58] Field of Search ........................ 356/3.01, 3.02, 356/3.03, 3.06, 375, 376, 3.09; 250/559.23, 559.31, 559.38

[56] References Cited

FOREIGN PATENT DOCUMENTS

| 4032361 | 4/1992 | Germany | ........................ 356/375 |
| 62-028610 A | 2/1987 | Japan . | |

Primary Examiner—F. L. Evans
Attorney, Agent, or Firm—McDermott, Will & Emery

[57] ABSTRACT

A light having a single wavelength which is emitted from a light emitting element comprising a light emitting diode, a semiconductor laser or the like is changed to a parallel light by a collimator lens. The parallel light emitted from the collimator lens which has been changed or is being changed to such a beam as to keep a small beam diameter for a long distance by a conical lens is irradiated on a surface of an object to be measured. The light diffused from the surface of the object to be measured is collected into a position detecting element by a condenser lens so that a distance on the surface of the object to be measured can be measured.

13 Claims, 10 Drawing Sheets

DISTANCE MEASURING METHOD AND DISTANCE SENSOR

BACKGROUND OF THE INVENTION

The present invention relates to a distance measuring method and a distance sensor capable of performing measurement with a large depth and high resolution.

Figure 9:
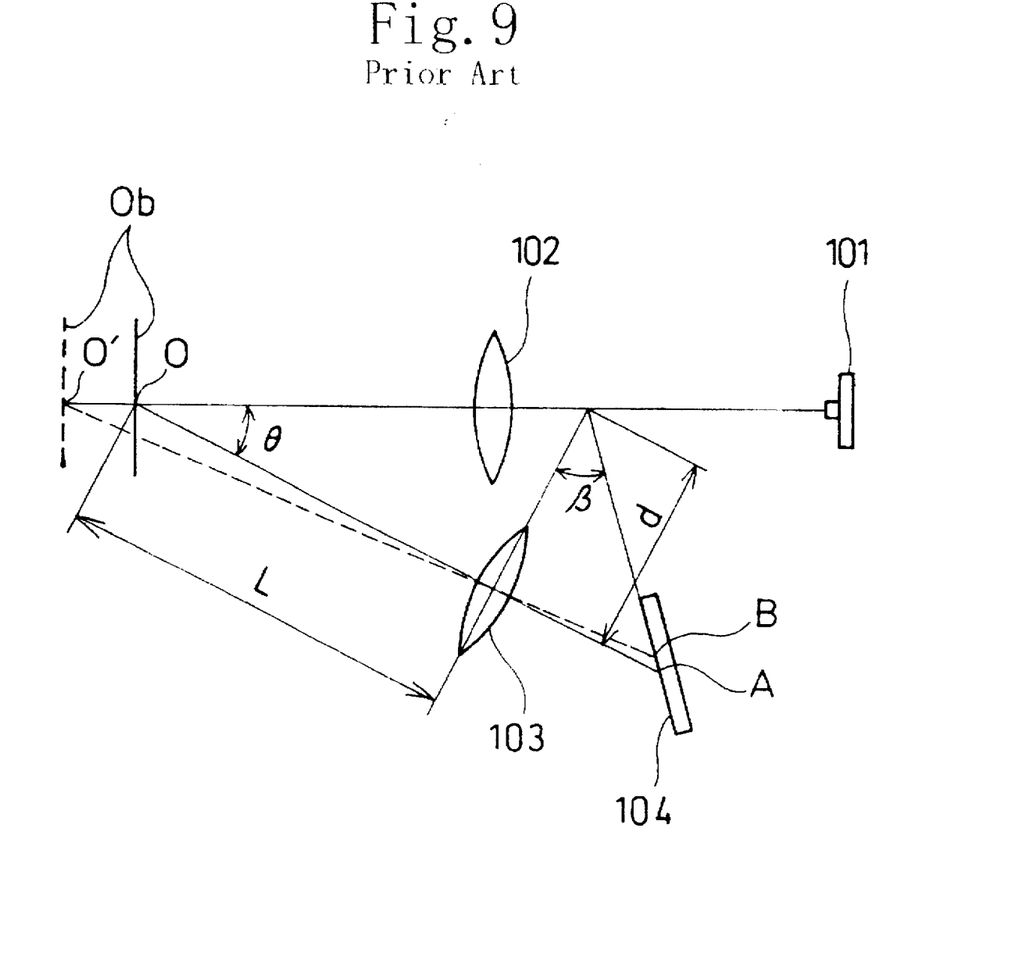
FIG. 9 is a diagram for explaining a structure and operation of a distance sensor according to the prior art.

For example, a distance sensor according to the prior art has been disclosed in Japanese Unexamined Patent Publication No. 62-28610. FIG. 9 shows a basic structure of the distance sensor according to the prior art. In FIG. 9, the reference numeral 101 denotes a light emitting element comprising a light emitting diode, a semiconductor laser or the like, the reference numeral 102 denotes a first lens having a numerical aperture NA, the reference numeral 103 denotes a second lens having a focal length f, and the reference numeral 104 denotes a position detecting element comprising a PSD, a CCD or the like.

These optical systems are formed so as to meet conditions of Scheimpflug. The conditions of Scheimpflug have a relationship among the focal length f of the second lens 103, an angle β formed by a principal plane of the second lens 103 and a detecting plane of the position detecting element 104, a distance L from an intersection O of an optical axis of the light emitting element 101 and that of the second lens 103 to the second lens 103, and a distance d from an intersection of the optical axis of the light emitting element 101 and the principal plane of the second lens 103 to a principal point of the second lens 103.

$$\beta = \tan^{-1}(f_0/d) \tag{1}$$

$$f_0 = f \cdot L/(L-f)$$

If the optical system meets the conditions of Scheimpflug, a beam which is imaged by the first lens 102 is imaged on the position detecting element 104 by the second lens 103 also in the case where an object to be measured Ob is on a point O' shifted from the focal position O of the first lens 102 as well as the case where the object to be measured Ob is on the focal position O of the first lens 102.

Operation of the distance sensor having the above-mentioned structure will be described below.

A light emitted from the light emitting element 101 is imaged on the object to be measured Ob positioned on the point O by the first lens 102. The light which is imaged on the object to be measured Ob positioned on the point O is diffused on the object to be measured Ob. A part of the diffused light is imaged on a point A on the position detecting element 104 by the second lens 103. In the case where the position of the object to be measured Ob is set to the point O', the light is imaged on a point B on the position detecting element 104 because the optical system meets the conditions of Scheimpflug as described above. An amount of movement, unevenness and the like of the object to be measured Ob on the optical axis of the light emitting element 101 correspond to an amount of movement of an imaging position on the position detecting element 104. Therefore, the amount of movement, unevenness and the like of the object of be measured Ob can be obtained by measuring the amount of movement of the imaging position on the position detecting element 104.

Figure 10:
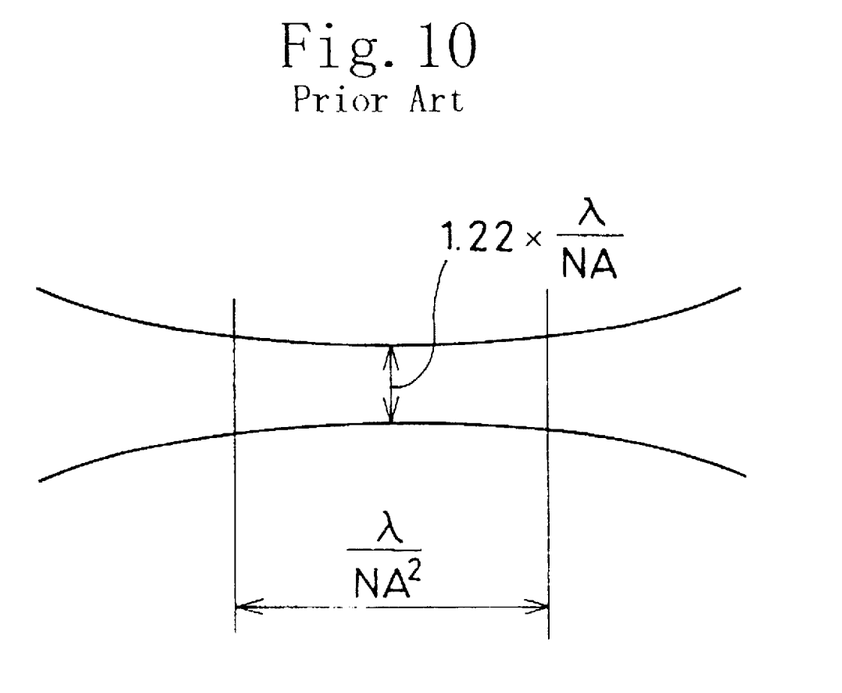
FIG. 10 is a chart for explaining problems of the distance sensor according to the prior art.

With the structure according to the prior art, however, the light which passes through the first lens 102 wave-optically has a depth of focus of $\lambda/(NA)^2$ and a beam diameter of $1.22 \times \lambda/NA$ determined by the numerical aperture NA of the first lens 102 and a wavelength $\lambda$ of the light emitting element 101 as shown in FIG. 10. Accordingly, when getting away from the focal position O of the first lens 102, the beam diameter on the object to be measured Ob is increased so that lateral resolution of the distance sensor is lowered. For example, in the case where a He—Ne beam ($\lambda$:633 nm) and the first lens (numerical aperture:NA=0.1) are used, the depth of focus is set to 63 μm and the beam diameter is set to 7.7 μm.

With the structure according to the prior art, thus, when the numerical aperture NA of the first lens 102 is decreased in order to realize a large depth of focus, the beam diameter is increased. With the structure according to the prior art described above, a demand for the large depth of focus and that for a small beam diameter have a conflicting relationship. It is physically difficult to set the beam diameter to 20 μm or less with a depth of focus of 100 mm.

According to the distance sensor having the conventional structure, consequently, it is hard to perform measurement with a measuring depth of 100 mm or more and high precision.

SUMMARY OF THE INVENTION

In consideration of the foregoing, it is an object of the present invention to provide a distance measuring method and a distance sensor capable of performing measurement with a large depth and high precision.

In order to achieve the above-mentioned object, the present invention is characterized in that a parallel light having a single wavelength which has been changed or is being changed to such a beam as to keep a small beam diameter for a long distance is irradiated on a surface of an object to be measured.

The present invention provides a distance measuring method comprising the steps of emitting a parallel light having a single wavelength, irradiating, on a surface of an object to be measured, the emitted parallel light which has been changed or is being changed to such a beam as to keep a small beam diameter for a long distance, collecting the beam which is irradiated on the surface of the object to be measured and is then diffused, detecting a position of the collected beam, and measuring a distance on the surface of the object to be measured on the basis of the detected position of the beam.

The distance measuring method according to the present invention comprises the step of irradiating, on a surface of an object to be measured, the parallel light having a single wavelength which has been changed or is being changed to such a beam as to keep a small beam diameter for a long distance. The beam irradiated on the surface of the object to be measured keeps the small beam diameter for the long distance. Consequently, the beam diameter is kept small also in a position which is a little away from a focal position of the beam. Accordingly, the small beam diameter can be realized within a range in which a depth of focus is large. Thus, it is possible to perform measurement with a large depth and high precision.

The present invention provides a first distance sensor comprising a light emitting element for emitting a light having a single wavelength, a collimator lens for changing the light emitted from the light emitting element to a parallel light, and for emitting the parallel light, a projection unit for emitting, toward a surface of an object to be measured, the parallel light emitted from the collimator lens which has been changed or is being changed to such a beam as to keep a small beam diameter for a long distance, a condenser lens for collecting the light diffused from the surface of the object to be measured, and a position detecting element for detecting a position of the light collected by the condenser lens.

According to the first distance sensor, the projection unit emits, toward the surface of the object to be measured, the parallel light which has been changed or is being changed to such a beam as to keep a small beam diameter for a long distance. Consequently, the beam diameter is kept small also in a position which is a little away from a focal position of the beam. Accordingly, the small beam diameter can be realized within a range in which a depth of focus is large. Thus, it is possible to perform measurement with a large depth and high precision.

The present invention provides a second distance sensor comprising a light emitting element for emitting a light having a single wavelength, a collimator lens for changing the light emitted from the light emitting element to a parallel light, and for emitting the parallel light, a projection unit for emitting the parallel light emitted from the collimator lens which has been changed or is being changed to such a beam as to keep a small beam diameter for a long distance, a scanning mirror for emitting the beam emitted from the projection unit toward a surface of an object to be measured while scanning the beam, and for reflecting the light diffused from the surface of the object to be measured, a condenser lens for collecting the diffused light reflected from the scanning mirror, and a position detecting element for detecting a position of the light collected by the condenser lens.

According to the second distance sensor, in the same manner as the first distance sensor, the projection unit emits, toward the surface of the object to be measured, the parallel light which has been changed or is being changed to such a beam as to keep a small beam diameter for a long distance. Consequently, the beam diameter is kept small also in a position which is a little away from a focal position of the beam. Accordingly, the small beam diameter can be realized within a range in which a depth of focus is large. Thus, it is possible to perform measurement with a large depth and high precision.

The scanning mirror emits the beam emitted from the projection unit toward the surface of the object to be measured while scanning the beam. Consequently, it is possible to measure, at a high speed, a distance in a direction of scan performed by the scanning mirror on the surface of the object to be measured.

The present invention provides a third distance sensor comprising a light emitting element for emitting a light having a single wavelength, a collimator lens for changing the light emitted from the light emitting element to a parallel light, and for emitting the parallel light, a projection unit for emitting the parallel light emitted from the collimator lens which has been changed or is being changed to such a beam as to keep a small beam diameter for a long distance, a scanning mirror for emitting the beam emitted from the projection unit while scanning the beam, an illuminating lens for emitting the beam emitted from the scanning mirror in a direction perpendicular to a surface of an object to be measured, a first cylindrical lens for collecting a component in a direction perpendicular to a direction of scan performed by the scanning mirror out of the light which is emitted from the illuminating lens and diffused from the surface of the object to be measured, a second cylindrical lens for collecting a component parallel with an optical axis of the first cylindrical lens out of the light collected by the first cylindrical lens, and a position detecting element for detecting a position of the light collected by the second cylindrical lens.

According to the third distance sensor, in the same manner as the first distance sensor, the projection unit emits, toward the surface of the object to be measured, the parallel light which has been changed or is being changed to such a beam as to keep a small beam diameter for a long distance. Consequently, the beam diameter is kept small also in a position which is a little away from a focal position of the beam. Accordingly, the small beam diameter can be realized within a range in which a depth of focus is large. Thus, it is possible to perform measurement with a large depth and high precision.

In the same manner as the second distance sensor, the scanning mirror emits the beam emitted from the projection unit toward the surface of the object to be measured while scanning the beam. Consequently, it is possible to measure, in a short time, a distance in a direction of scan performed by the scanning mirror on the surface of the object to be measured.

Furthermore, the illuminating lens emits the beam emitted from the scanning mirror in a direction perpendicular to the surface of the object to be measured. Consequently, the beam surely reaches a measuring point of the object to be measured even if the surface of the object to be measured has unevenness. Accordingly, so-called hiding or the like is not caused by scanning the beam. Thus, measurement can be performed precisely.

The present invention provides a fourth distance sensor comprising a light emitting element for emitting a light having a single wavelength, a collimator lens for changing the light emitted from the light emitting element to a parallel light, and for emitting the parallel light, a projection unit for emitting the parallel light emitted from the collimator lens which has been changed or is being changed to such a beam as to keep a small beam diameter for a long distance, a scanning mirror having a first reflecting plane for emitting the beam emitted from the projection unit toward a surface of an object to be measured while scanning the beam, a transmitting section for transmitting the light diffused by the surface of the object to be measured, and a second reflecting plane provided on a back side of the first reflecting plane for reflecting the incident light, a fixed mirror for leading the light transmitted through the transmitting section of the scanning mirror to the second reflecting plane of the scanning mirror, a condenser lens for collecting the diffused light reflected by the second reflecting plane of the scanning mirror, and a position detecting element for detecting a position of the light collected by the condenser lens.

According to the fourth distance sensor, in the same manner as the first distance sensor, the projection unit emits, toward the surface of the object to be measured, the parallel light which has been changed or is being changed to such a beam as to keep a small beam diameter for a long distance. Consequently, the beam diameter is kept small also in a position which is a little away from a focal position of the beam. Accordingly, the small beam diameter can be realized within a range in which a depth of focus is large. Thus, it is possible to perform measurement with a large depth and high precision.

In the same manner as the second distance sensor, the first reflecting plane of the scanning mirror emits the beam emitted from the projection unit toward the surface of the object to be measured while scanning the beam. Consequently, it is possible to measure, at a high speed, a distance in a direction of scan performed by the scanning mirror on the surface of the object to be measured.

Furthermore, in the case where plane deflection in a direction of distance measurement is generated on the scanning mirror, the plane deflection of the first reflecting mirror can be offset by the second reflecting mirror. Accordingly, also in the case where the plane deflection in the direction of distance measurement is generated on the scanning mirror, the plane deflection of the first reflecting mirror can be offset by the second reflecting mirror. Consequently, an error such as the plane deflection is not made. Thus, the distance can be measured with high precision.

In any of the first to fourth distance sensors, preferably, the projection unit includes a conical lens. Thus, it is possible to surely implement the projection unit for emitting the parallel light which has been changed or is being changed to such a beam as to keep a small beam diameter for a long distance.

In any of the first to fourth distance sensors, preferably, the projection unit includes a mask for causing the parallel light emitted from the collimator lens to pass therethrough while diffracting the parallel light by a ring-shaped opening, and a lens for collecting the diffracted light passing through the mask into the beam. Thus, it is possible to surely implement the projection unit for emitting the parallel light which has been changed or is being changed to such a beam as to keep a small beam diameter over a long distance.

The above-mentioned object and novel features of the present invention will become more apparent in conjunction with the following detailed description with reference to the accompanying drawings.

BRIEF DESCRIPTION OF THE DRAWINGS

The accompanying drawings show preferred embodiments of the present invention, in which.

DETAILED DESCRIPTION OF THE INVENTION (First Embodiment)

Figure 1:
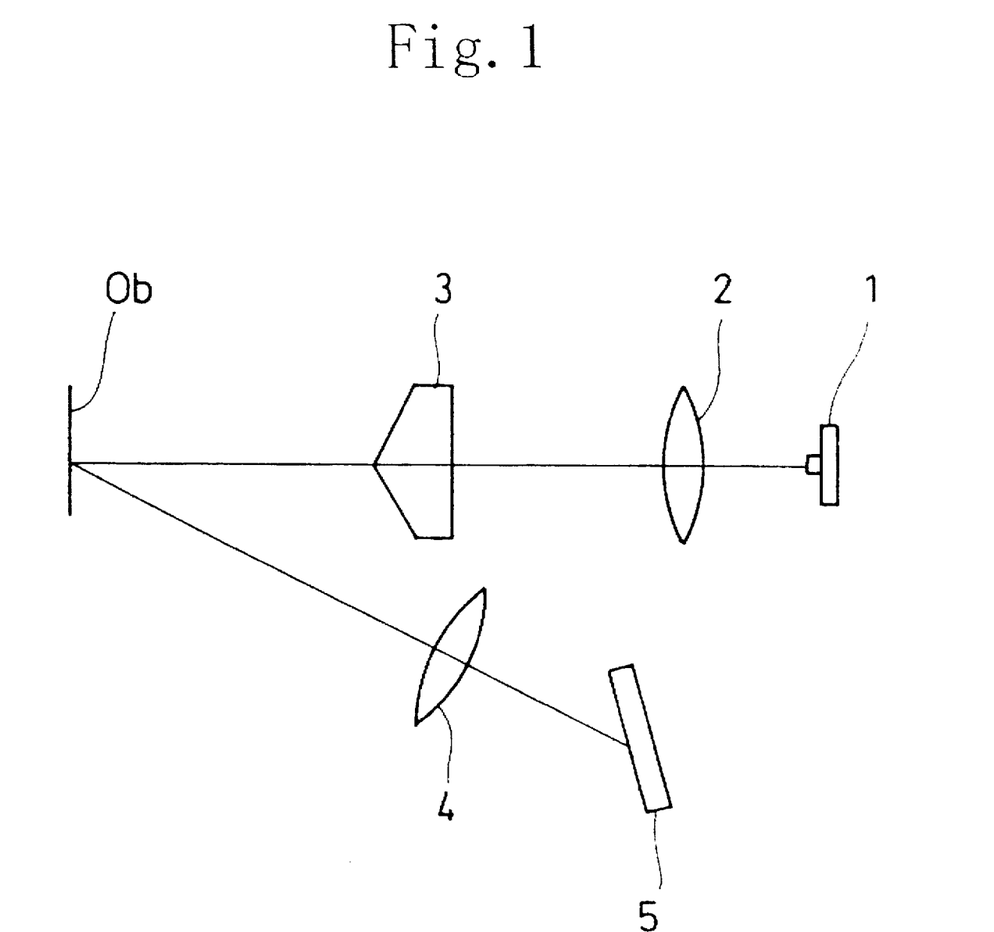
FIG. 1 is a diagram showing a basic structure of a distance measuring method and a distance sensor according to a first embodiment of the present invention.

FIG. 1 shows a basic structure of a distance measuring method and a distance sensor according to a first embodiment of the present invention. In FIG. 1, the reference numeral 1 denotes a light emitting element comprising a light emitting diode, a semiconductor laser or the like for emitting a light having a single wavelength, and the reference numeral 2 denotes a collimator lens for changing the light emitted from the light emitting element 1 to a parallel light. The light emitting element 1 and the collimator lens 2 form a light emitting section. The reference numeral 3 denotes a conical lens having a conical shape with a vertical angle $\alpha$ and having a refractive index n. The conical lens 3 forms a projection unit. The reference numeral 4 denotes a condenser lens, and the reference numeral 5 denotes a position detecting element for detecting a position by using a PSD or performing a picture processing on an output of a CCD such as a line sensor. These optical systems meet the conditions of Scheimpflug described in the prior art.

Operation of the distance measuring method and the distance sensor according to the first embodiment having the above-mentioned structure will be described below.

Figure 2:
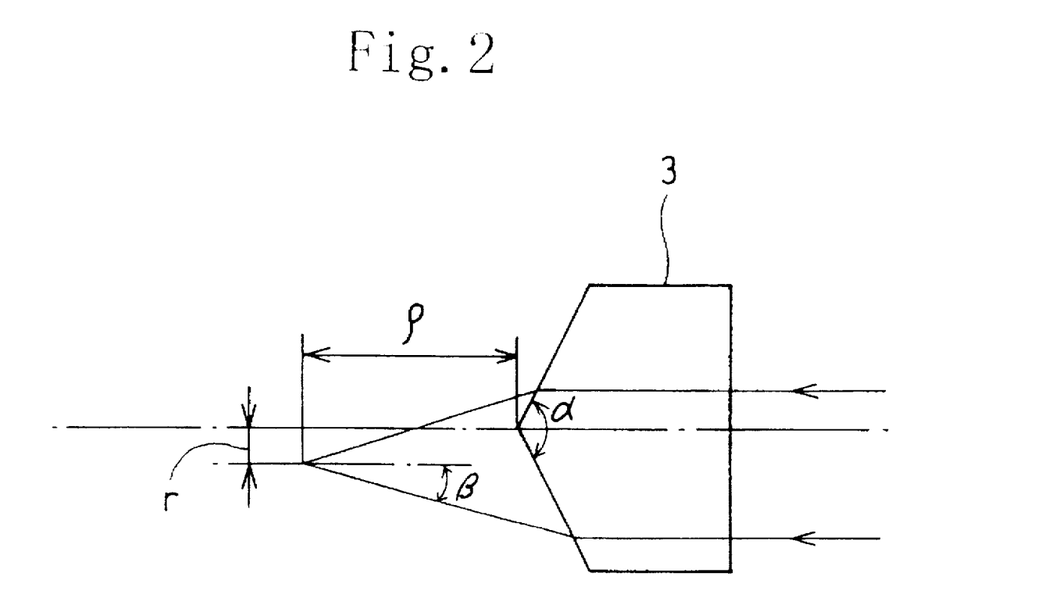
FIG. 2 is a diagram for explaining operation of a conical lens according to the first embodiment of the present invention.

A light emitted from the light emitting element 1 is changed to a parallel light by the collimator lens 2. The parallel light is incident on the conical lens 3, and is then refracted at an angle $\beta$ to an optical axis represented by Equation (2) by the conical lens 3 as shown in FIG. 2.

$$\beta = \sin^{-1}\{n \cdot \sin'(\pi/2 - \alpha/2)\} - \pi/2 + \alpha/2 \qquad (2)$$

A light energy density:I ($\rho$, r) on a point apart from an apex of the conical lens 3 by a distance $\rho$ along the optical axis and from the optical axis by a distance r is obtained from Equation (3) by geometrical optic analysis.

$$I(\rho,r) = 2i \times \frac{\tan^2(\alpha/2)\tan(\beta)}{\{\tan(\alpha/2) - \tan(\beta)\}^2} \times \frac{\rho}{r} \qquad (3)$$

It is apparent from the Equation (3) that a beam profile is a 1/r curve and the light energy density is maximum on the optical axis. A region $\rho$ having a high light energy density is represented by Equation (4), wherein an effective diameter of the conical lens 3 is indicated at D.

$$\rho < D/\{2 \tan(\beta)\} \qquad (4)$$

For example, when a vertical angle $\alpha$ of the conical lens 3 is 165 degrees, the effective diameter D is 30 mm, and a refractive index n is 1.515, the region $\rho$ having a high light energy density is less than 287 mm so that a large depth of focus can be realized.

Figure 3:
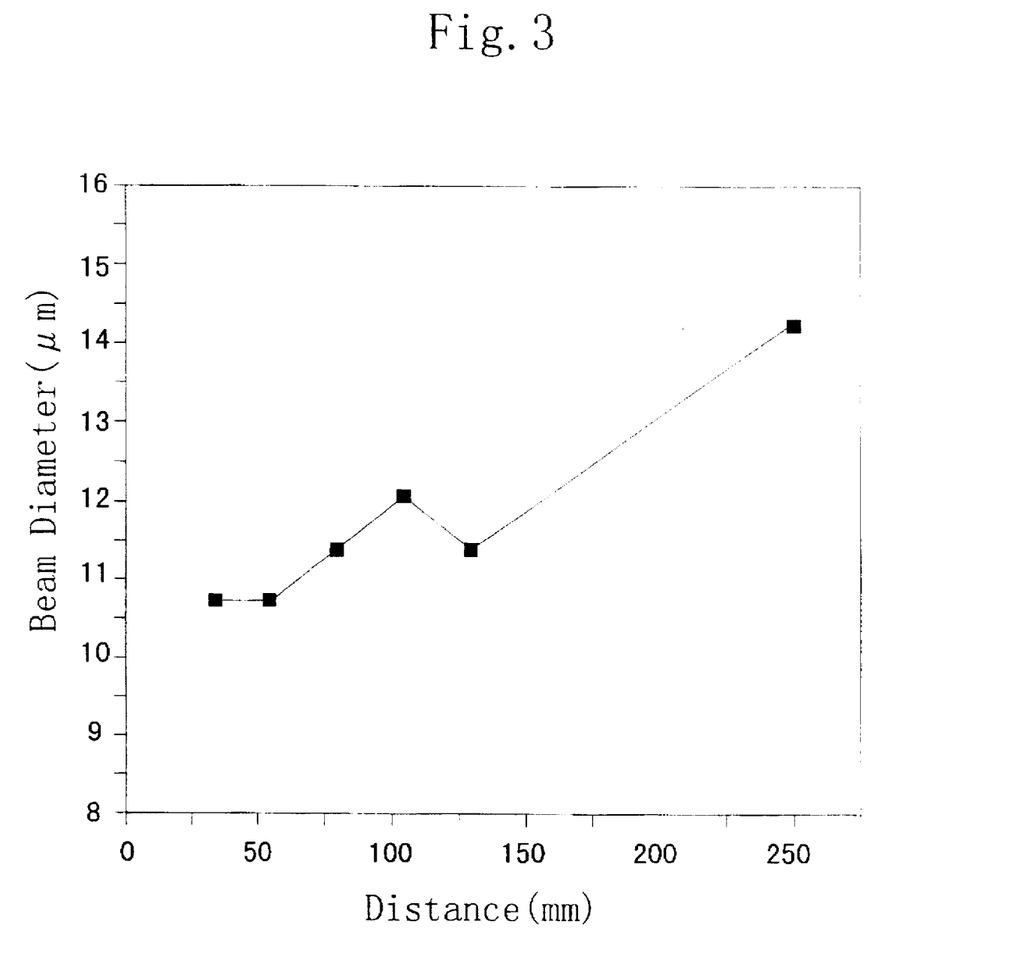
FIG. 3 is a chart for explaining characteristics of the conical lens according to the first embodiment of the present invention.

FIG. 3 shows a result obtained by performing an experiment using the conical lens 3 and a He—Ne beam in the above-mentioned structure. It is apparent from FIG. 3 that a beam diameter of 15 μm or less can be realized in a region apart from the apex of the conical lens 3 by a distance of 250 mm or less. The small beam diameter kept over a long distance will be hereinafter referred to as a large depth of focus and a small beam diameter.

By using the above-mentioned irradiation beam to measure a distance in the same manner as in the prior art, the distance measuring method and the distance sensor capable of performing measurement with a large depth and high resolution can be implemented.

According to the first embodiment described above, the optical system is provided with the collimator lens 2 for changing the light emitted from the light emitting element 1 to the parallel light and the conical lens 3 for collecting the parallel light. Consequently, the irradiation beam can have a depth of focus of 200 mm or more and a beam diameter of 20 μm or less. Therefore, distance measurement can be performed with a large depth and high resolution.

(Second Embodiment)

Figure 4A:
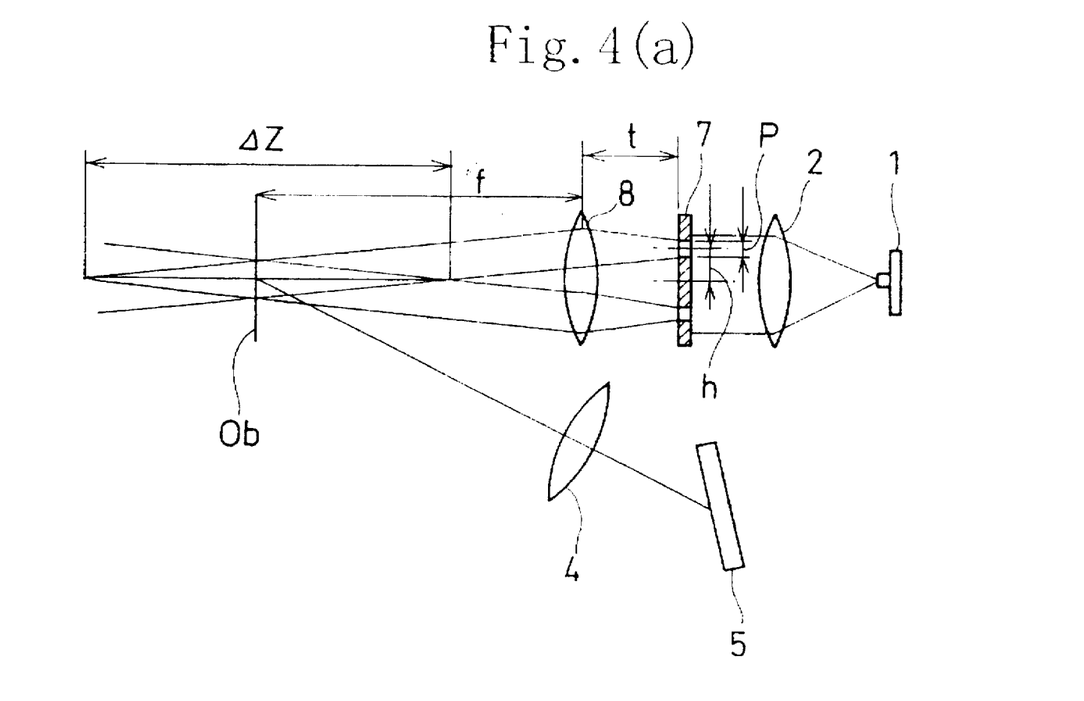
FIGS. 4(a) and 4(b) are diagrams showing a basic structure of a distance measuring method and a distance sensor according to a second embodiment of the present invention.
Figure 4B:
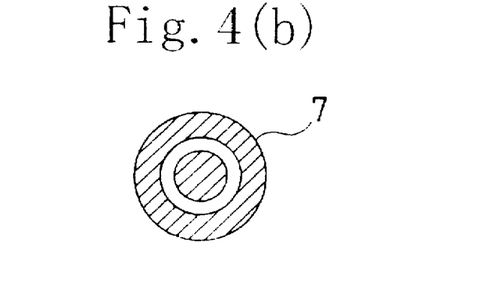

FIG. 4(a) shows a basic structure of a distance measuring method and a distance sensor according to a second embodiment of the present invention. In FIG. 4(a), components having the same functions as in FIG. 1 have the same reference numerals and their description will be omitted. In FIG. 4(a), the reference numeral 7 denotes a mask including a circular slit having a width p on a position apart from an optical axis by a distance h, on which a parallel light emitted from a collimator lens 2 is incident. The reference numeral 8 denotes a projection lens having a focal length f provided apart from the mask 7 by a distance t for projecting the light diffracted by the mask 7 on an object to be measured Ob. The mask 7 and the projection lens 8 form a projection unit. FIG. 4(b) shows a planar structure of the mask 7. In FIG. 4(b), the circular slit is a portion which is not shown by hatching. These optical systems meet the conditions of Scheimpflug described in the prior art.

Operation of the distance measuring method and the distance sensor according to the second embodiment having the above-mentioned structure will be described below.

A light having a single wavelength $\lambda$ which is emitted from the light emitting element 1 is changed to a parallel light by the collimator lens 2, and is then incident on the mask 7. The parallel light is diffracted by the circular slit of the mask 7 and is changed to a diffused light having a width of 1.22×t/p (including 84% of all light energies transmitted through the circular slit) on a principal plane of the projection lens 8. By the projection lens 8, the diffused light is changed to a light similar to the light emitted from the conical lens 3 in the first embodiment. A region having a high light energy density $\Delta Z$ is represented by Equation (5).

$$\Delta Z = 1.22 \times f \bullet t \bullet \lambda / (p \bullet h) \quad (5)$$

For example, if h=1 mm, p=0.01 mm, f=200 mm, t=10 mm and $\lambda$=633 nm, $\Delta Z$=154 mm so that a measuring depth can be set to 100 mm or more. In the same manner as in the first embodiment, a beam diameter can be set to about 20 μm.

Accordingly, the distance measuring method and the distance sensor capable of performing measurement with a large depth and high resolution can be implemented by using the above-mentioned irradiation beam to measure a distance in the same manner as in the prior art.

According to the second embodiment described above, the optical system is provided with the mask 7 having the circular slit and the projection lens 8. Consequently, the irradiation beam can have a large depth of focus and a small beam diameter. Therefore, a distance can be measured with a large depth and high resolution.

(Third Embodiment)

Figure 5:
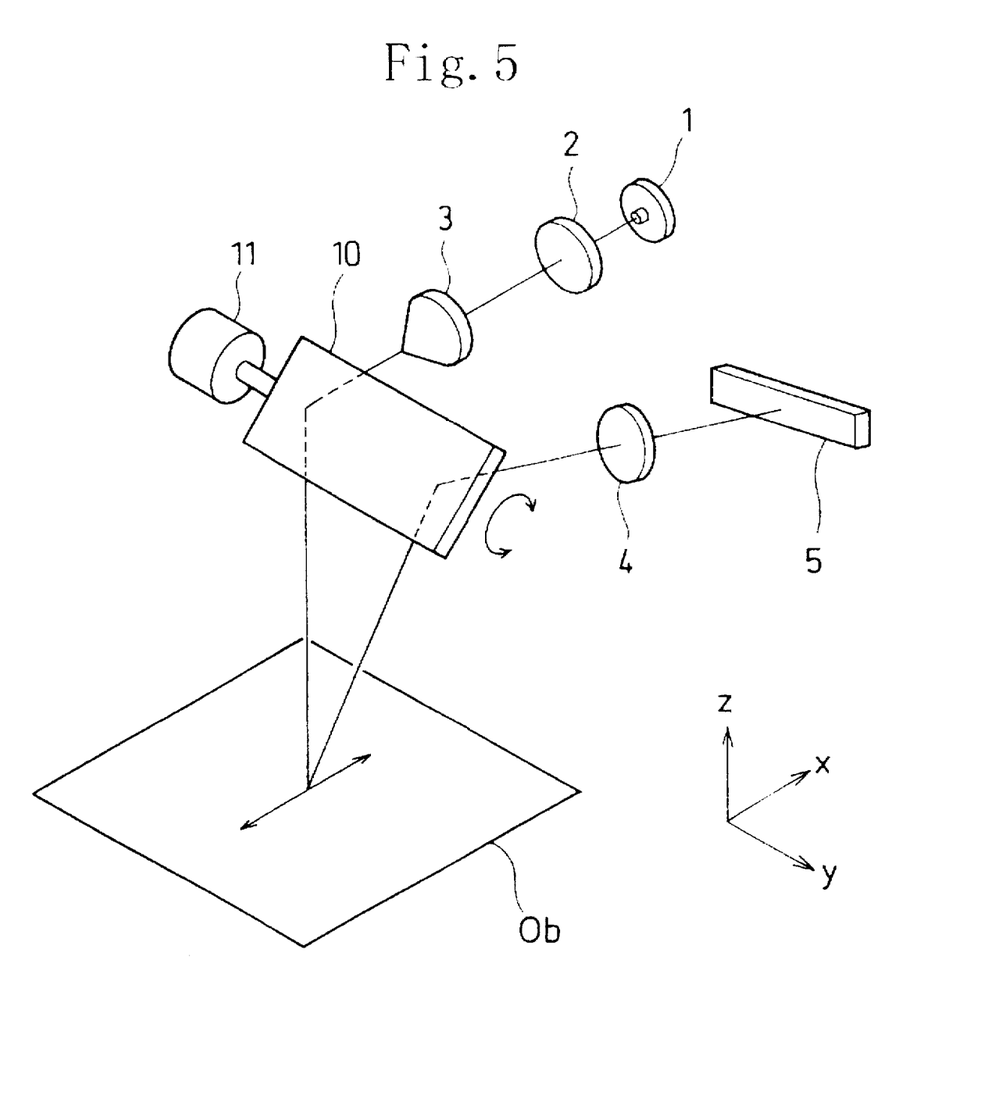
FIG. 5 is a diagram showing a basic structure of a distance sensor according to a third embodiment of the present invention.

FIG. 5 shows a basic structure of a distance sensor according to a third embodiment of the present invention. In FIG. 5, components having the same functions as in FIG. 1 have the same reference numerals and their description will be omitted. While a conical lens 3 is used as a projection unit in the third embodiment in the same manner as in the first embodiment, it is needless to say that the projection unit described in the second embodiment may be used. In FIG. 5, the reference numeral 10 denotes a scanning mirror for scanning the light emitted from the projection unit in an x-axis direction and leading the light diffused from an object to be measured Ob to a condenser lens 4, and the reference numeral 11 denotes a scanning motor for rotating and scanning the scanning mirror 10. These optical systems meet the conditions of Scheimpflug described in the prior art.

Operation of the distance sensor according to the third embodiment having the above-mentioned structure will be described below.

A light having a single wavelength $\lambda$ which is emitted from a light emitting element 1 is changed to a parallel light by a collimator lens 2, and is incident on the conical lens 3. The light emitted from the conical lens 3 is irradiated on the object to be measured Ob through the scanning mirror 10. The scanning mirror 10 is rotated by the scanning motor 11 so as to perform scan on the object to be measured Ob in the x-axis direction. A part of the light diffused on the object to be measured Ob is collected on a position detecting element 5 through the scanning mirror 10 and the condenser lens 4.

As described above, a distance can be measured in the same manner as in the prior art. In addition, as described in the first and second embodiments, the distance sensor capable of performing measurement with a large depth and high resolution can be implemented by using the projection unit which is formed by the conical lens and the like and realizes a large depth of focus and a small beam diameter.

By using the scanning mirror 10 and the scanning motor 11, the scan can optically be performed in the x-axis direction unlike the first and second embodiments. Consequently, measurement can be performed in a short time.

(Fourth Embodiment)

Figure 6:
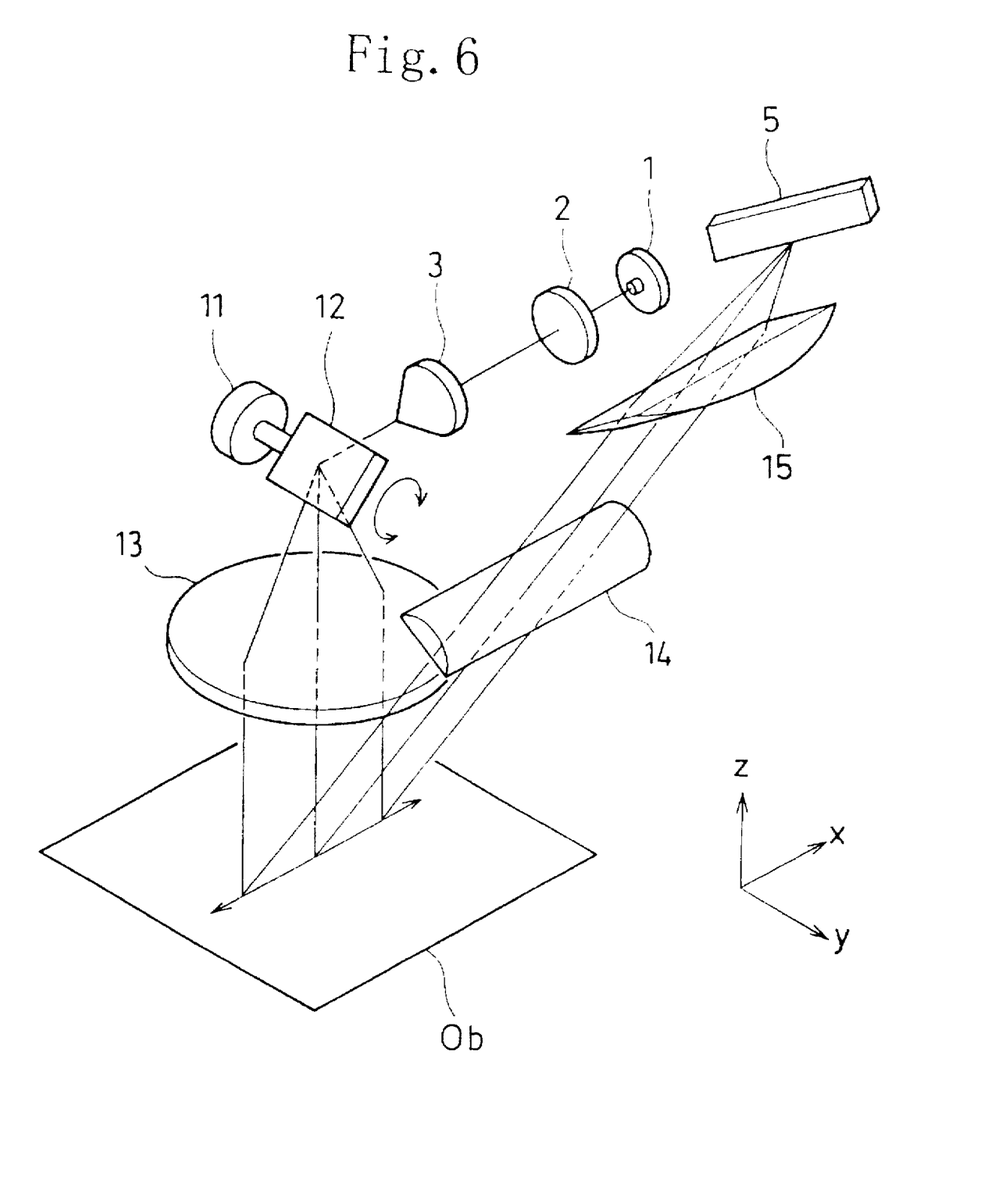
FIG. 6 is a diagram showing a basic structure of a distance sensor according to a fourth embodiment of the present invention.

FIG. 6 shows a basic structure of a distance sensor according to a fourth embodiment of the present invention. In FIG. 6, components having the same functions as in FIG. 5 have the same reference numerals and their description will be omitted. While a conical lens 3 is used as a projection unit in the fourth embodiment in the same manner as in the first embodiment, it is needless to say that the projection unit described in the second embodiment may be used. In FIG. 6, the reference numeral 12 denotes a scanning mirror, the reference numeral 13 denotes an illuminating lens which uses the scanning mirror 12 as a front focal plane and has an optical axis orthogonal to an object to be measured Ob, the reference numeral 14 denotes a first cylindrical lens for imaging, on a position detecting element 5, a diffused light in a y-axis direction on the object to be measured Ob, and the reference numeral 15 denotes a second cylindrical lens which uses the position detecting element 5 as a rear focal plane and images, on the position detecting element 5, a light parallel with an optical axis of the first cylindrical lens 14. These optical systems meet the conditions of Scheimpflug described in the prior art.

Operation of the distance sensor according to the fourth embodiment having the above-mentioned structure will be described below.

A light having a single wavelength $\lambda$ which is emitted from a light emitting element 1 is changed to a parallel light by a collimator lens 2, and is incident on the conical lens 3. The light emitted from the conical lens 3 is led to the illuminating lens 13 through the scanning mirror 12. The illuminating lens 13 uses the scanning mirror 12 as the front focal plane and has the optical axis orthogonal to the object to be measured Ob. Consequently, the light emitted from the illuminating lens 13 is irradiated orthogonally to the object to be measured Ob. In the beam irradiated by the illuminating lens 13, the region having a high light energy density represented by the Equation (4) or (5) is decreased by the collecting function of the illuminating lens 13. However, if a numerical aperture NA of the illuminating lens 13 is reduced, the vertical angle α of the conical lens 3 is caused to approximate to 180 degrees in the Equation (4) and the width p of the circular slit is reduced in the Equation (5), the region having a high light energy density can be set to 100 mm or more.

Only a component in a y-axis direction of the light diffused on the object to be measured Ob is collected on a plane of the position detecting element 5 by the first cylindrical lens 14. Only a light which is emitted from the first cylindrical lens 14 and is parallel with the optical axis of the first cylindrical lens 14 is collected on the position detecting element 5 by the second cylindrical lens 15.

As described above, a distance can be measured in the same manner as in the prior art. In addition, as described in the first and second embodiments, the distance sensor capable of performing measurement with a large depth and high resolution can be implemented by using the projection unit which is formed by the conical lens and the like and realizes a large depth of focus and a small beam diameter.

By using the scanning mirror 12 and the scanning motor 11, scan can optically be performed in an x-axis direction unlike the first and second embodiments. Consequently, measurement can be performed in a short time.

Figure 7:
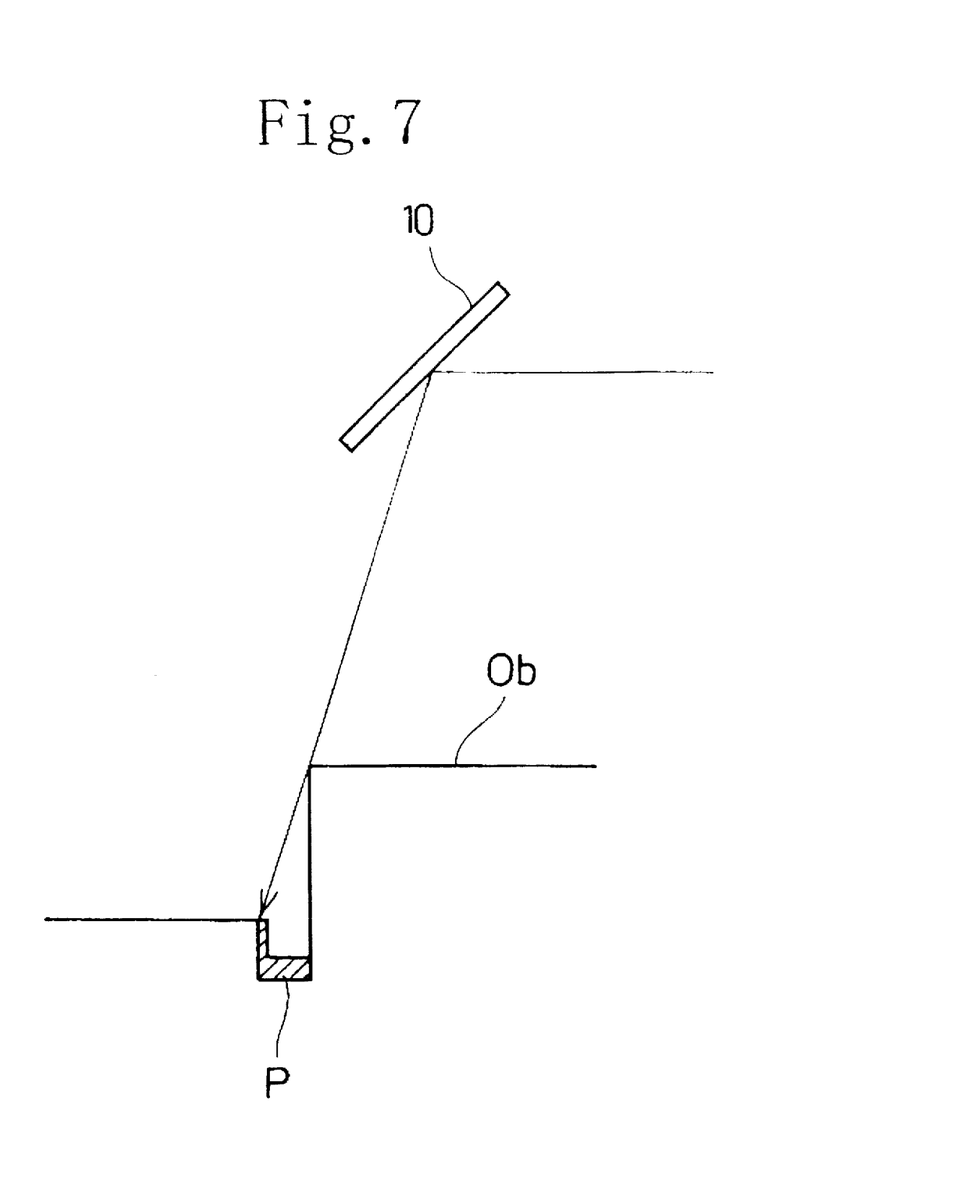
FIG. 7 is a diagram for explaining problems of the distance sensor according to the third embodiment of the present invention.

A difference between the third and fourth embodiments will be described below with reference to FIG. 7. FIG. 7 shows the case where an object to be measured Ob having a step difference is measured according to the third embodiment. In the third embodiment, scan and rotation are performed by using the scanning mirror 10 as an origin. Consequently, an irradiated light is not incident on a region P shown by an oblique line portion on the object to be measured Ob. Therefore, there is a portion which cannot be measured. The reason is that the irradiated light is not incident orthogonally to the object to be measured Ob.

According to the fourth embodiment, the illuminating lens 13 is provided. Consequently, the irradiated light is always incident orthogonally to the object to be measured Ob. Therefore, a portion, for example, the region P shown in FIG. 7 on which the irradiated light is not incident is not generated. Thus, measurement can be performed precisely.

While an fθ lens may be used as the illuminating lens 13 in the fourth embodiment, it is needless to say that an ftan (θ) lens or fsin (θ) lens may be used if f has a great value.

(Fifth Embodiment)

Figure 8:
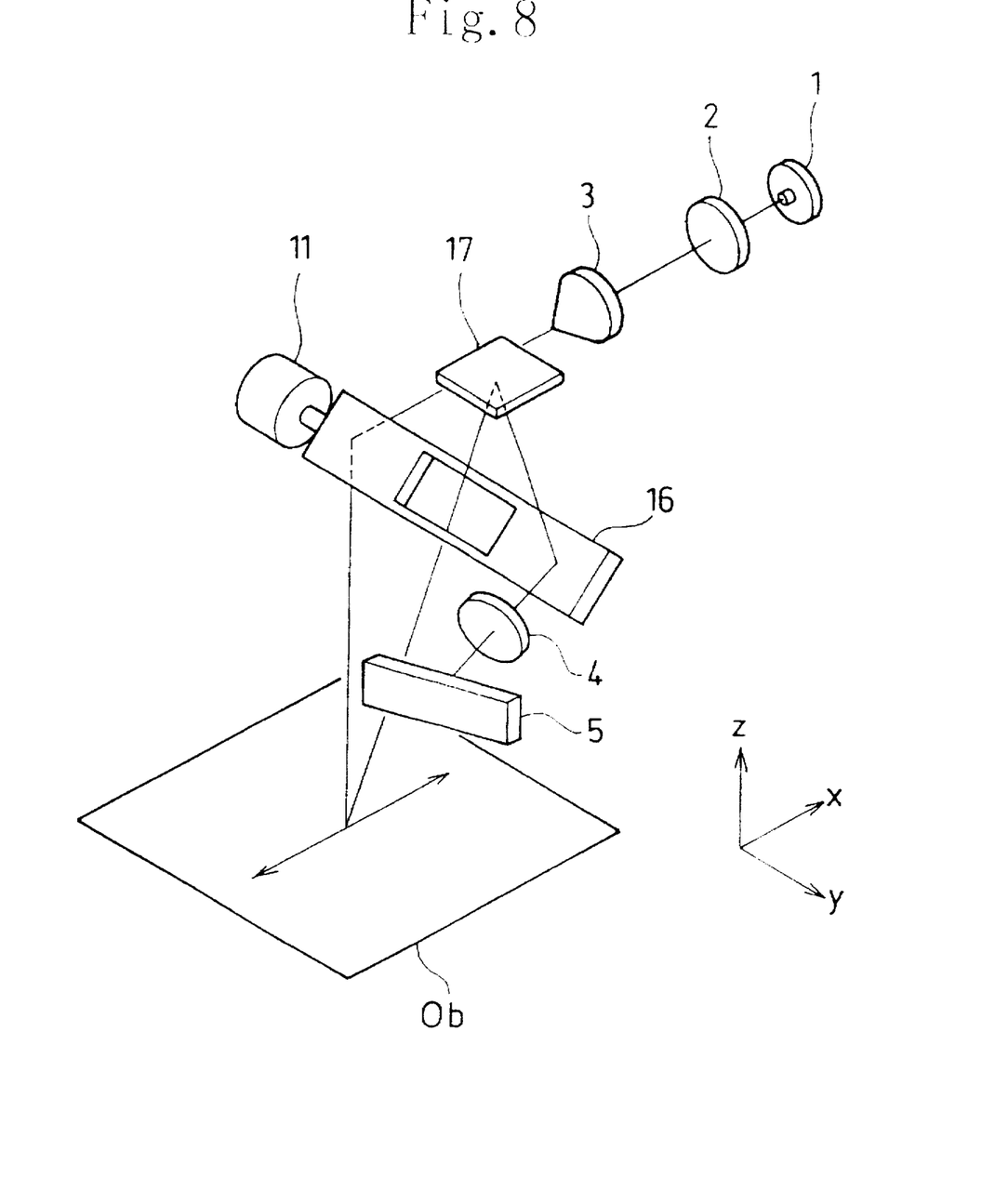
FIG. 8 is a diagram showing a basic structure of a distance sensor according to a fifth embodiment of the present invention.

FIG. 8 shows a basic structure of a distance sensor according to a fifth embodiment of the present invention. In FIG. 8, components having the same functions as in FIG. 5 have the same reference numerals and their description will be omitted. While a conical lens 3 is used as a projection unit in the fifth embodiment in the same manner as in the first embodiment, it is needless to say that the projection unit described in the second embodiment may be used. In FIG. 8, the reference numeral 16 denotes a scanning mirror. The scanning mirror 16 has a first reflecting plane for reflecting a light emitted from the conical lens 3 toward an object to be measured Ob, a second reflecting plane provided on a back side of the first reflecting plane, and a central opening through which the light diffused from the object to be measured Ob is transmitted. The reference numeral 17 denotes a fixed mirror for leading the light diffused from the object to be measured Ob and transmitted through the opening of the scanning mirror 16 to the second reflecting plane of the scanning mirror 16, and for imaging the diffused light reflected by the second reflecting plane on a position detecting element 5 through a condenser lens 4. These optical systems meet the conditions of Scheimpflug described in the prior art.

Operation of the distance sensor according to the fifth embodiment having the above-mentioned structure will be described below.

A light having a single wavelength λ which is emitted from a light emitting element 1 is changed to a parallel light by a collimator lens 2 and is incident on the conical lens 3. The light emitted from the conical lens 3 is irradiated on the object to be measured Ob through the first reflecting plane of the scanning mirror 16. A part of the light diffused on the object to be measured Ob is transmitted through the opening of the scanning mirror 16, and is reflected by the fixed mirror 17. The fixed mirror 17 is provided so as to lead the light diffused from the object to be measured Ob to the second reflecting plane of the scanning mirror 16 and to image the light on the position detecting element 5 through the condenser lens 4. Therefore, the light diffused on the object to be measured Ob is imaged on the position detecting element 5.

As described above, a distance can be measured in the same manner as in the prior art. In addition, as described in the first and second embodiments, the distance sensor capable of performing measurement with a large depth and high resolution can be implemented by using the projection unit which is formed by the conical lens and the like and realizes a large depth of focus and a small beam diameter.

By using the scanning mirror 16 and the scanning motor 11, scan can optically be performed in an x-axis direction unlike the first to fourth embodiments. Consequently, measurement can be performed in a short time.

A difference between the third and fifth embodiments will be described below. According to the third embodiment, when plane deflection or axial deflection in a y-axis direction is generated on the scanning mirror 10 and the scanning motor 11, movement is performed in the y-axis direction on the position detecting element 5, that is, in a direction of distance measurement so that a distance measuring error is made. The plane deflection can be corrected if it is regularly generated synchronously with a rotating angle of the scanning motor 11. However, the plane deflection cannot be corrected if it has no repetitive reproducibility. Consequently, the plane deflection makes the distance measuring error so that precision of distance measurement is deteriorated.

According to the fifth embodiment, the scanning mirror 16 and the fixed mirror 17 are provided. Even if the plane deflection in the y-axis direction is generated on the scanning mirror 16 and the scanning motor 11, a back of the scanning mirror 16 is used to reflect the light again so that an influence of the plane deflection in the y-axis direction can be offset. Consequently, the distance measurement can be performed with high precision.

Although the present invention has fully been described by way of example with reference to the accompanying drawings, it is to be understood that various changes and modifications will be apparent to those skilled in the art. Therefore, unless otherwise such changes and modifications depart from the scope of the invention, they should be construed as being included therein.

We claim:

1. A distance measuring method comprising the steps of:
   emitting a parallel light having a single wavelength;
   irradiating, on a surface of an object to be measured, the emitted parallel light which has been changed or is being changed to such a beam as to keep a small beam diameter for a long distance;

collecting the beam which is irradiated on the surface of the object to be measured and is then diffused;

detecting a position of the collected beam; and measuring a distance on the surface of the object to be measured on the basis of the detected position of the beam.

2. A distance sensor comprising:

a light emitting element for emitting a light having a single wavelength;

a collimator lens for changing the light emitted from the light emitting element to a parallel light, and for emitting the parallel light;

a projection unit for emitting, toward a surface of an object to be measured, the parallel light emitted from the collimator lens which has been changed or is being changed to such a beam as to keep a small beam diameter for a long distance;

a condenser lens for collecting the light diffused from the surface of the object to be measured; and a position detecting element for detecting a position of the light collected by the condenser lens.

3. The distance sensor of claim 2, wherein the projection unit includes a conical lens.

4. The distance sensor of claim 2, wherein the projection unit includes a mask for causing the parallel light emitted from the collimator lens to pass therethrough while diffracting the parallel light by a ring-shaped opening, and a lens for collecting the diffracted light passing through the mask into the beam.

5. A distance sensor comprising:

a light emitting element for emitting a light having a single wavelength;

a collimator lens for changing the light emitted from the light emitting element to a parallel light, and for emitting the parallel light;

a projection unit for emitting the parallel light emitted from the collimator lens which has been changed or is being changed to such a beam as to keep a small beam diameter for a long distance;

a scanning mirror for emitting the beam emitted from the projection unit toward a surface of an object to be measured while scanning the beam, and for reflecting the light diffused from the surface of the object to be measured;

a condenser lens for collecting the diffused light reflected from the scanning mirror; and a position detecting element for detecting a position of the light collected by the condenser lens.

6. The distance sensor of claim 5, wherein the projection unit includes a conical lens.

7. The distance sensor of claim 5, wherein the projection unit includes a mask for causing the parallel light emitted from the collimator lens to pass therethrough while diffracting the parallel light by a ring-shaped opening, and a lens for collecting the diffracted light passing through the mask into the beam.

8. A distance sensor comprising:

a light emitting element for emitting a light having a single wavelength;

a collimator lens for changing the light emitted from the light emitting element to a parallel light, and for emitting the parallel light;

a projection unit for emitting the parallel light emitted from the collimator lens which has been changed or is being changed to such a beam as to keep a small beam diameter for a long distance;

a scanning mirror for emitting the beam emitted from the projection unit while scanning the beam;

an illuminating lens for emitting the beam emitted from the scanning mirror in a direction perpendicular to a surface of an object to be measured;

a first cylindrical lens for collecting a component in a direction perpendicular to a direction of scan performed by the scanning mirror out of the light which is emitted from the illuminating lens and diffused from the surface of the object to be measured;

a second cylindrical lens for collecting a component parallel with an optical axis of the first cylindrical lens out of the light collected by the first cylindrical lens; and a position detecting element for detecting a position of the light collected by the second cylindrical lens.

9. The distance sensor of claim 8, wherein the projection unit includes a conical lens.

10. The distance sensor of claim 8, wherein the projection unit includes a mask for causing the parallel light emitted from the collimator lens to pass therethrough while diffracting the parallel-light by a ring-shaped opening, and a lens for collecting the diffracted light passing through the mask into the beam.

11. A distance sensor comprising:

a light emitting element for emitting a light having a single wavelength;

a collimator lens for changing the light emitted from the light emitting element to a parallel light, and for emitting the parallel light;

a projection unit for emitting the parallel light emitted from the collimator lens which has been changed or is being changed to such a beam as to keep a small beam diameter for a long distance;

a scanning mirror having a first reflecting plane for emitting the beam emitted from the projection unit toward a surface of an object to be measured while scanning the beam, a transmitting section for transmitting the light diffused by the surface of the object to be measured, and a second reflecting plane provided on a back side of the first reflecting plane for reflecting the incident light;

a fixed mirror for leading the light transmitted through the transmitting section of the scanning mirror to the second reflecting plane of the scanning mirror;

a condenser lens for collecting the diffused light reflected by the second reflecting plane of the scanning mirror; and a position detecting element for detecting a position of the light collected by the condenser lens.

12. The distance sensor of claim 11, wherein the projection unit includes a conical lens.

13. The distance sensor of claim 11, wherein the projection unit includes a mask for causing the parallel light emitted from the collimator lens to pass therethrough while diffracting the parallel light by a ring-shaped opening, and a lens for collecting the diffracted light passing through the mask into the beam.

* * * * *